United States Patent
Jogalekar et al.

(10) Patent No.: US 9,124,506 B2
(45) Date of Patent: Sep. 1, 2015

(54) TECHNIQUES FOR END-TO-END NETWORK BANDWIDTH OPTIMIZATION USING SOFTWARE DEFINED NETWORKING

(71) Applicant: Brocade Communications Systems, Inc., San Jose, CA (US)

(72) Inventors: Prasad Jogalekar, San Jose, CA (US); Suresh Vobbilisetty, San Jose, CA (US); Muhammad Durrani, Sunnyvale, CA (US); Ram Krishnan, Cupertino, CA (US); Mukhtiar Shaikh, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 132 days.

(21) Appl. No.: 14/069,276

(22) Filed: Oct. 31, 2013

(65) Prior Publication Data
US 2014/0362686 A1   Dec. 11, 2014

Related U.S. Application Data

(60) Provisional application No. 61/832,655, filed on Jun. 7, 2013.

(51) Int. Cl.
*H04L 1/00*   (2006.01)
*H04L 12/801*  (2013.01)
*H04L 12/721*  (2013.01)
*H04L 12/715*  (2013.01)

(52) U.S. Cl.
CPC ............... *H04L 47/12* (2013.01); *H04L 45/12* (2013.01); *H04L 45/38* (2013.01); *H04L 45/64* (2013.01)

(58) Field of Classification Search
None
See application file for complete search history.

(56) References Cited

U.S. PATENT DOCUMENTS

| 8,559,314 | B2 * | 10/2013 | Yedavalli et al. | 370/238 |
| 8,644,149 | B2 * | 2/2014 | Yedavalli | 370/231 |
| 2014/0173018 | A1 * | 6/2014 | Westphal et al. | 709/213 |

* cited by examiner

*Primary Examiner* — Frank Duong
(74) *Attorney, Agent, or Firm* — Fountainhead Law Group P.C.

(57) ABSTRACT

Techniques for end-to-end network bandwidth optimization using software defined networking are provided. In one embodiment, a computer system can receive information regarding a flow to be admitted to a network, where the flow is associated with a source and a destination. The computer system can further calculate, for each path in a plurality of paths between the source and the destination, a projected utilization of the path in view of the flow. If the projected utilization of the shortest path in the plurality of paths is less than or equal to a target utilization threshold, the computer system can assign the flow to the shortest path. Otherwise, the computer system can select a path in the plurality of paths that comes closest to the target utilization threshold without exceeding the threshold and can assign the flow to that selected path.

20 Claims, 7 Drawing Sheets

TECHNIQUES FOR END-TO-END NETWORK BANDWIDTH OPTIMIZATION USING SOFTWARE DEFINED NETWORKING

CROSS REFERENCES TO RELATED APPLICATIONS

The present application claims the benefit and priority under 35 U.S.C. 119(e) of U.S. Provisional Application No. 61/832,655, filed Jun. 7, 2013, entitled "TECHNIQUES FOR END-TO-END NETWORK BANDWIDTH OPTIMIZATION USING SOFTWARE DEFINED NETWORKING," the entire contents of which are incorporated herein by reference for all purposes.

BACKGROUND

Figure 1:
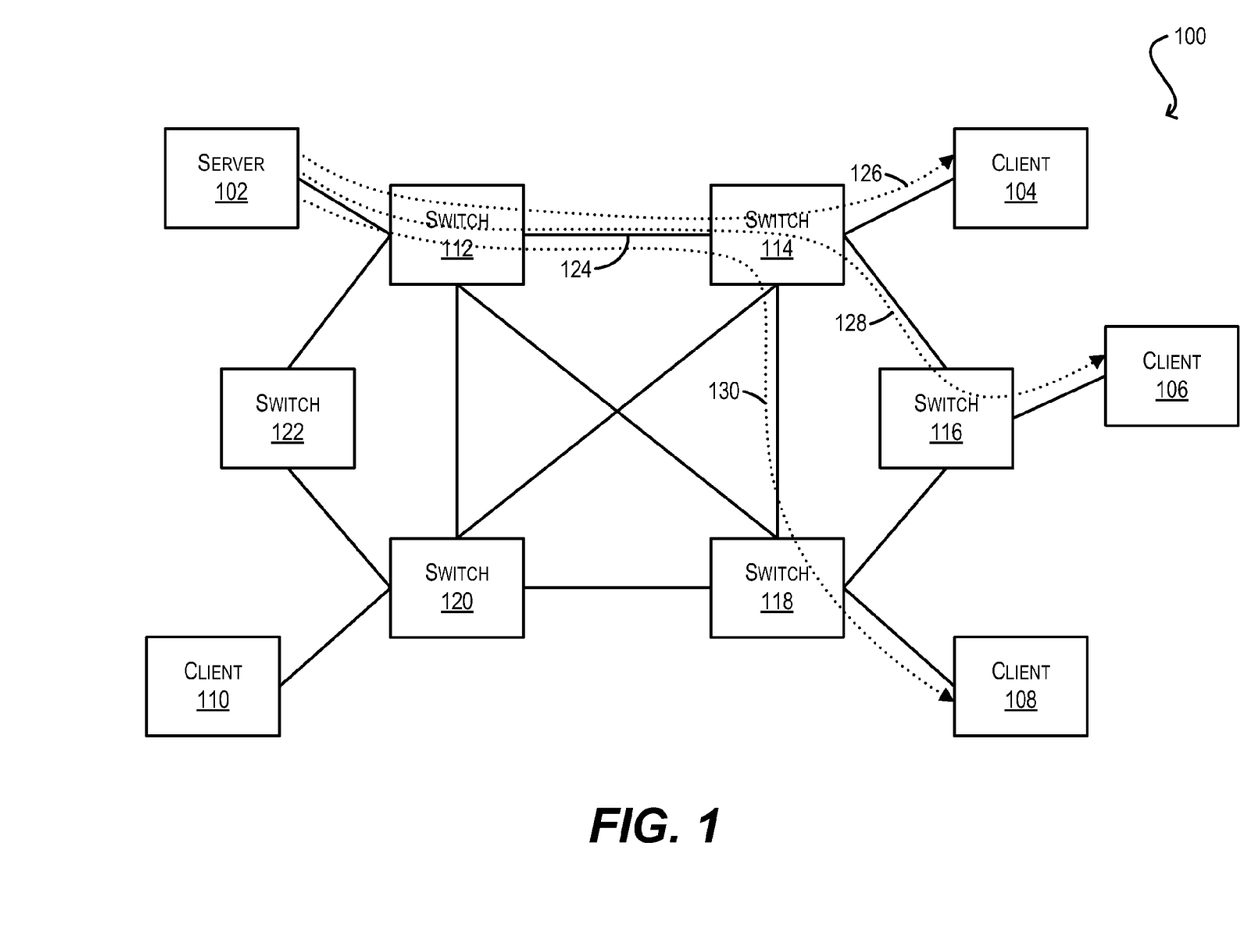
FIG. 1 depicts an exemplary network.

In current Layer 2 (L2) and Layer 3 (L3) networks, path selection for flows is typically based on some variant of a cost-based "shortest path" algorithm. One problem with relying solely on this approach for path selection is that certain links common to the shortest paths of several flows may become congested, while other available paths/links in the network topology may remain underutilized. This problem is visualized in network 100 of FIG. 1, which depicts a server 102 in communication with clients 104-110 via switches 112-122. In this example, the shortest paths between server 102 and clients 104, 106, and 108 respectively all include the link between switches 112 and 114 (i.e., link 124), and thus the flows between server 102 and clients 104, 106, and 108 (i.e., flows 126, 128, and 130) all traverse link 124. This, in turn, means that link 124 may become over-utilized and potentially bottleneck flows 126, 128, and 130, even though there are other, less utilized paths in network 100 that server 102 can use to communicate with clients 104, 106, and 108.

The congestion problem described above can be mitigated to an extent by reserving link bandwidth on a per-flow basis using a resource reservation protocol, such as MPLS-based RSVP-TE. However, such protocols generally require hop-by-hop bandwidth admission control and path setup signaling, which add to the overall deployment and operational complexity of the network. In addition, due to their distributed nature, resource reservation protocols are not designed to address the issue of network-wide bandwidth fragmentation (i.e., the division of available network bandwidth into small, isolated fragments). When this type of fragmentation occurs, the network may be unable to admit future, large bandwidth flows, even if the network has sufficient available bandwidth at the aggregate level.

SUMMARY

Techniques for end-to-end network bandwidth optimization using software defined networking (SDN) are provided. In one embodiment, a computer system can receive information regarding a flow to be admitted to a network, where the flow is associated with a source and a destination. The computer system can further calculate, for each path in a plurality of paths between the source and the destination, a projected utilization of the path in view of the flow. If the projected utilization of the shortest path in the plurality of paths is less than or equal to a target utilization threshold, the computer system can assign the flow to the shortest path. Otherwise, the computer system can select a path in the plurality of paths that comes closest to the target utilization threshold without exceeding the threshold and can assign the flow to that selected path.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

The present disclosure describes techniques that can be performed by a centralized entity (e.g., an SDN controller device) for optimizing end-to-end bandwidth in a network. In one set of embodiments, the SDN controller device can initially collect information regarding the network, such as topology information, user-defined policies, and so on. The SDN controller device can further compute, for each source/destination pair in the network, a list of best (i.e., shortest) paths for the pair based on the collected information.

When a flow is to be admitted to the network, the SDN controller device can retrieve the list of best paths that was previously computed for the flow's source and destination. The SDN controller device can then calculate, for each path in the list, a projected utilization of the path in view of the flow. In one embodiment, the projected utilization can be calculated as the sum of (1) a "bin occupancy" parameter that corresponds to a utilization percentage of the most utilized link in the path, and (2) a "flow usage" parameter that corresponds to an estimated percentage of the most utilized link that would be consumed by the flow. If the projected utilization of the shortest path in the list is less than or equal to a predefined threshold (referred to herein as a "target utilization threshold"), the SDN controller device can assign the flow to the shortest path. Otherwise, the SDN controller device can select the path in the list that comes closest to the target utilization threshold (without exceeding it) and can assign the flow to that selected path.

With the approach described above, the SDN controller device can perform per-flow path selection/assignment in a manner that effectively load balances flows across paths and minimizes congestion in the network. For example, by enforcing the target utilization threshold as an upper bound on acceptable path utilization, the SDN controller device can generally avoid path assignments that will result in overloaded links. In addition, since the SDN controller device performs this processing centrally, there is no need for any in-band control or signaling across network nodes (as required by, e.g., resource reservation protocols and other distributed traffic engineering technologies).

The foregoing approach also advantageously minimizes network-wide bandwidth fragmentation, thereby leaving "headroom" for the admission of future flows. For instance, assume that the projected utilization of the shortest path for a given flow is deemed to be beyond a target utilization threshold of 70%, and there are two remaining candidate paths for the flow—a first path with 30% bin occupancy and a second path with 10% bin occupancy. Further, assume that the flow will take up an additional 30% utilization for either candidate path. In this scenario, the SDN controller device will assign the flow to the first path, since the projected utilization of the first path (30%+30%=60%) is closer to the target utilization threshold of 70% than the projected utilization of the second path (10%+30%=40%), without exceeding the threshold. This, in turn, leaves sufficient headroom on the second path to admit a possible future flow that takes up, e.g., 80% utilization. This would not be possible if the original flow were assigned to the second path, since in that case neither the first path nor the second path would have sufficient bandwidth to accept an 80% utilization flow.

In certain embodiments, in parallel with admitting flows, the SDN controller device can also monitor the ongoing bin occupancy of paths that have already been assigned to existing flows and can dynamically reallocate those existing flows as necessary. For example, in a particular embodiment, the SDN controller device can determine if any of the bin occupancies of assigned paths exceeds another predefined threshold (referred to herein as a "reallocation threshold"). If so, the SDN controller device can re-execute the path selection/assignment process noted above with respect one or more of the admitted flows. In this way, the SDN controller device can potentially reallocate those flows to less utilized paths and thereby achieve better load balancing across the network.

2. Exemplary System Environment and Computer System

Figure 2:
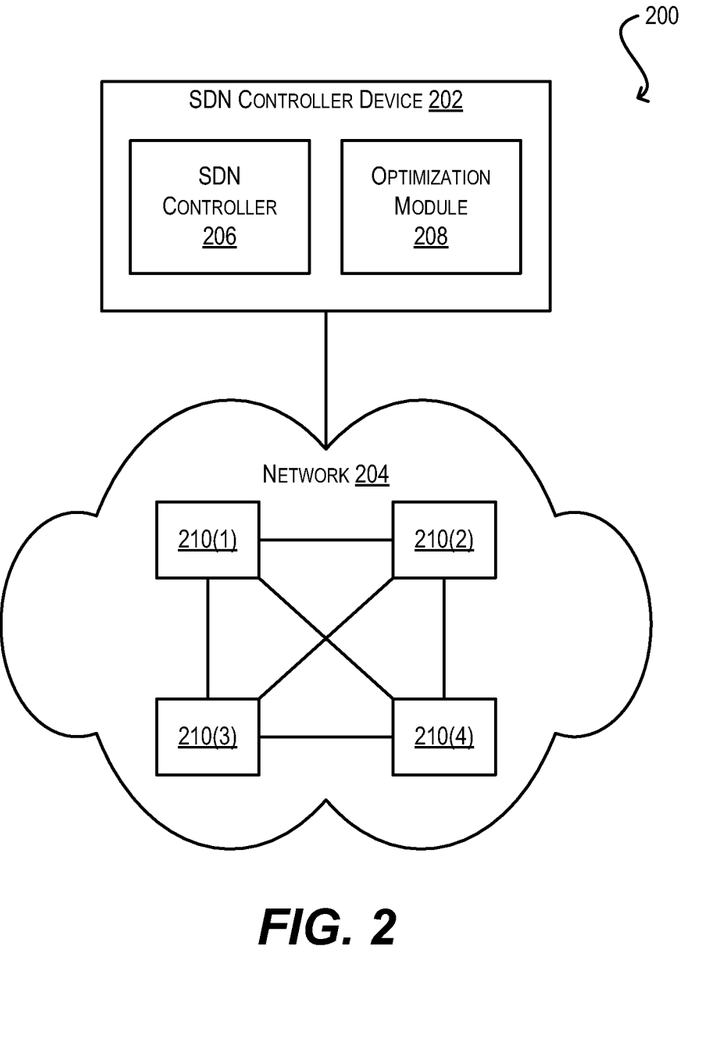
FIG. 2 depicts a system environment according to an embodiment.

FIG. 2 depicts a system environment 200 in which embodiments of the present invention may be implemented. As shown, system environment 200 includes an SDN controller device 202 that is communicatively coupled with a network 204. SDN controller device 202 can be implemented using, e.g., a general-purpose computer system or a dedicated computing device. Network 204 can be any Layer 2/3 network or fabric.

In the embodiment of FIG. 2, SDN controller device 202 comprises two components: an SDN controller 206 and an optimization module 208. As known in the art, SDN controller 206 is a software program that can control the operation of SDN-enabled network devices in a connected network, such as network devices 210(1)-210(4) in network 204. For instance, SDN controller 206 can send messages to network devices 210(1)-210(4) with instructions on how to perform various networking functions (e.g., routing, access control, etc.). SDN controller 206 can also receive information from network devices 210(1)-210(4) that facilitate network management. In one embodiment, SDN controller 206 can implement an industry-standard SDN protocol for communicating with network devices 210(1)-210(4), such as OpenFlow. In other embodiments, SDN controller 206 can implement a proprietary (e.g., vendor-specific) SDN protocol.

Optimization module 208 is a software component that can interface with SDN controller 206 and can execute the techniques described herein for optimally placing flows in network 204. For example, optimization module 208 can obtain network information (e.g., topology information, policies, link utilization, etc.) from SDN controller 206 and determine, based on the obtained information, how to assign flows to paths in order to keep link utilization high and bandwidth fragmentation low. Optimization module 208 can then pass the determined path assignments to SDN controller 206 for implementation/enforcement in network 204. Optimization module 208 can also dynamically reallocate existing flows across the paths of network 204 on an as-needed basis. The specific algorithms that optimization module 208 can execute in order to carry out these functions are described in further detail below.

It should be appreciated that system environment 200 is illustrative and not intended to limit embodiments of the present invention. For instance, although optimization module 208 is shown as being separate from SDN controller 206, in some embodiments the functionality of these two components can be combined into a single application/program. Further, the various entities depicted in system environment 200 may have other capabilities or include other subcomponents that are not specifically described. One of ordinary skill in the art will recognize many variations, modifications, and alternatives.

Figure 3:
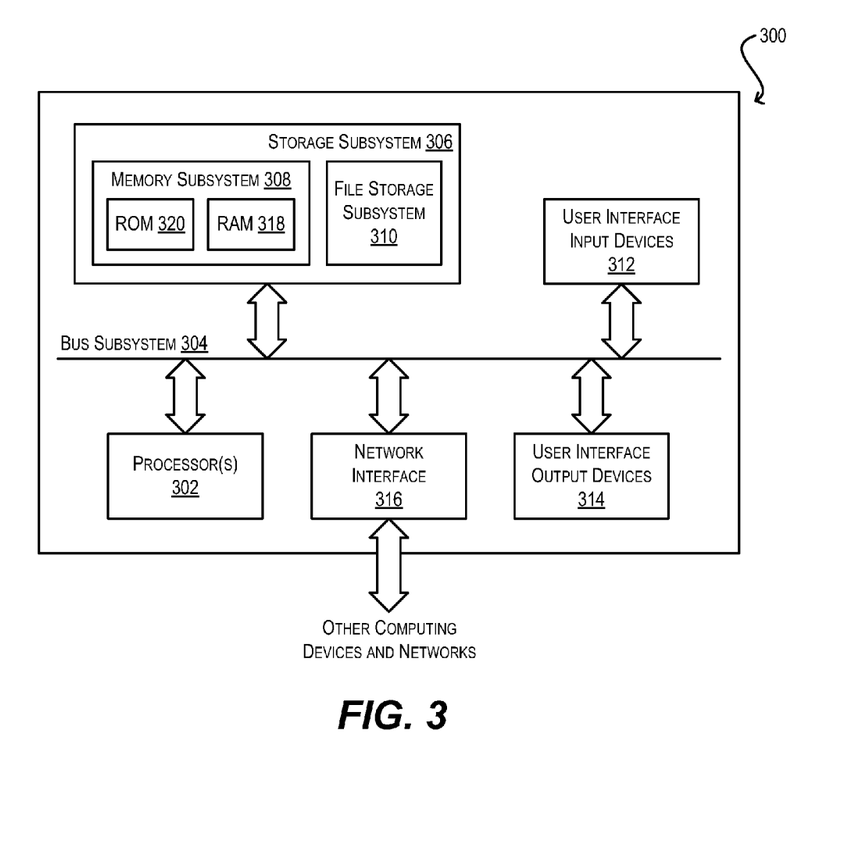
FIG. 3 depicts a computer system according to an embodiment.

FIG. 3 depicts an exemplary computer system 300 according to an embodiment. In one embodiment, computer system 300 can be used to implement SDN controller device 202 of FIG. 2. As shown in FIG. 3, computer system 300 can include one or more processors 302 that communicate with a number of peripheral devices via a bus subsystem 304. These peripheral devices can include a storage subsystem 306 (comprising a memory subsystem 308 and a file storage subsystem 310), user interface input devices 312, user interface output devices 314, and a network interface subsystem 316.

Bus subsystem 304 can provide a mechanism for letting the various components and subsystems of computer system 300 communicate with each other as intended. Although bus subsystem 304 is shown schematically as a single bus, alternative embodiments of the bus subsystem can utilize multiple busses.

Network interface subsystem 316 can serve as an interface for communicating data between computer system 300 and other computing devices or networks. Embodiments of network interface subsystem 316 can include wired (e.g., coaxial, twisted pair, or fiber optic Ethernet) and/or wireless (e.g., Wi-Fi, cellular, Bluetooth, etc.) interfaces.

User interface input devices 312 can include a keyboard, pointing devices (e.g., mouse, trackball, touchpad, etc.), a scanner, a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 300.

User interface output devices 314 can include a display subsystem, a printer, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 300.

Storage subsystem 306 can include a memory subsystem 308 and a file/disk storage subsystem 310. Subsystems 308 and 310 represent non-transitory computer readable storage media that can store program code and/or data used by, e.g., SDN controller 206 and/or optimization module 208 of FIG. 2.

Memory subsystem 308 can include a number of memories including a main random access memory (RAM) 318 for storage of instructions and data during program execution and a read-only memory (ROM) 320 in which fixed instructions are stored. File storage subsystem 310 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 300 is illustrative and many other configurations having more or fewer components than shown in FIG. 3 are possible.

3. Candidate Path Computation

Figure 4:
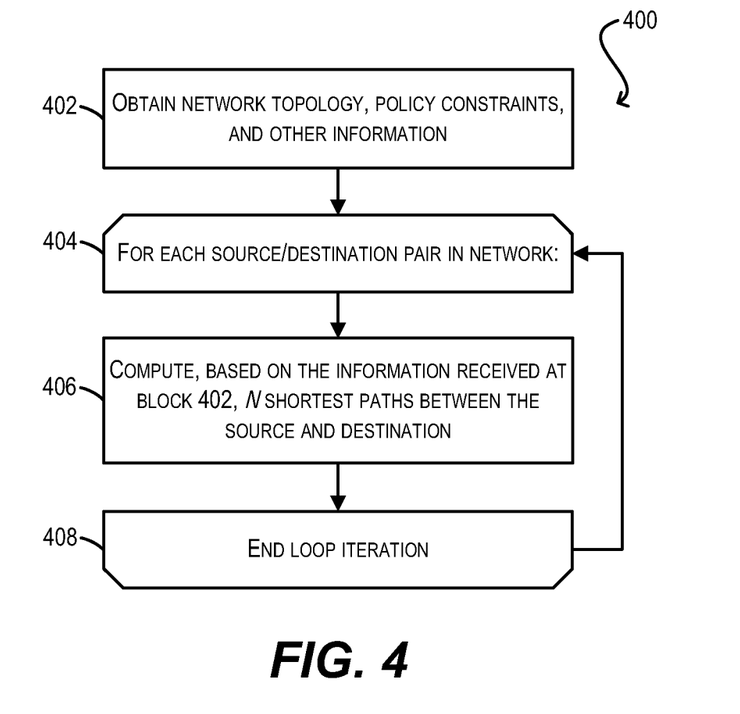
FIG. 4 depicts a flowchart for computing candidate paths for source/destination pairs according to an embodiment.

As noted above, in various embodiments optimization module 208 of FIG. 2 can carry out the task of optimally assigning flows to paths in network 204. FIG. 4 depicts an initial process 400 that optimization module 208 can perform, prior to admitting any flows, in order to identify candidate paths in the network.

At block 402, optimization module 208 can obtain topology information, policy constraints, and other information (e.g., flow/link statistics) regarding network 204. In some embodiments, optimization module 208 may query this information from SDN controller 206.

In other embodiments, optimization module 208 may retrieve this information from one more other network management tools.

At block 404, optimization module 208 can enter a loop for each source/destination pair in network 204. Within the loop, optimization module 208 can compute, based on the network topology, a list of best (i.e., shortest) paths between the current source and destination (block 406). This list corresponds to candidate paths that may be appropriate for assignment to flows that are associated with the source and destination.

As part of the processing of block 406, optimization module 208 can take into account one or more of the policy constraints received at block 402 in order to guide/control the shortest path computation. For example, optimization module 208 can limit the total number of computed paths for each source/destination pair to a value N, where N is specified by policy.

As another example, in a particular embodiment, optimization module 208 can apply a policy constraint that causes it to prune "used" links from the topology for each successive shortest path, thereby ensuring that no two paths for a given source/destination pair share a common link. This type of constraint can be useful in situations where topological/administrative independence across paths is desired.

Once the list of N shortest paths has been generated, the current loop iteration can end (block 408) and block 406 can be repeated for additional source/destination pairs in network 204. Optimization module 208 can then move on to assigning flows to paths as described in the next section.

4. Path Assignment

Figure 5A:
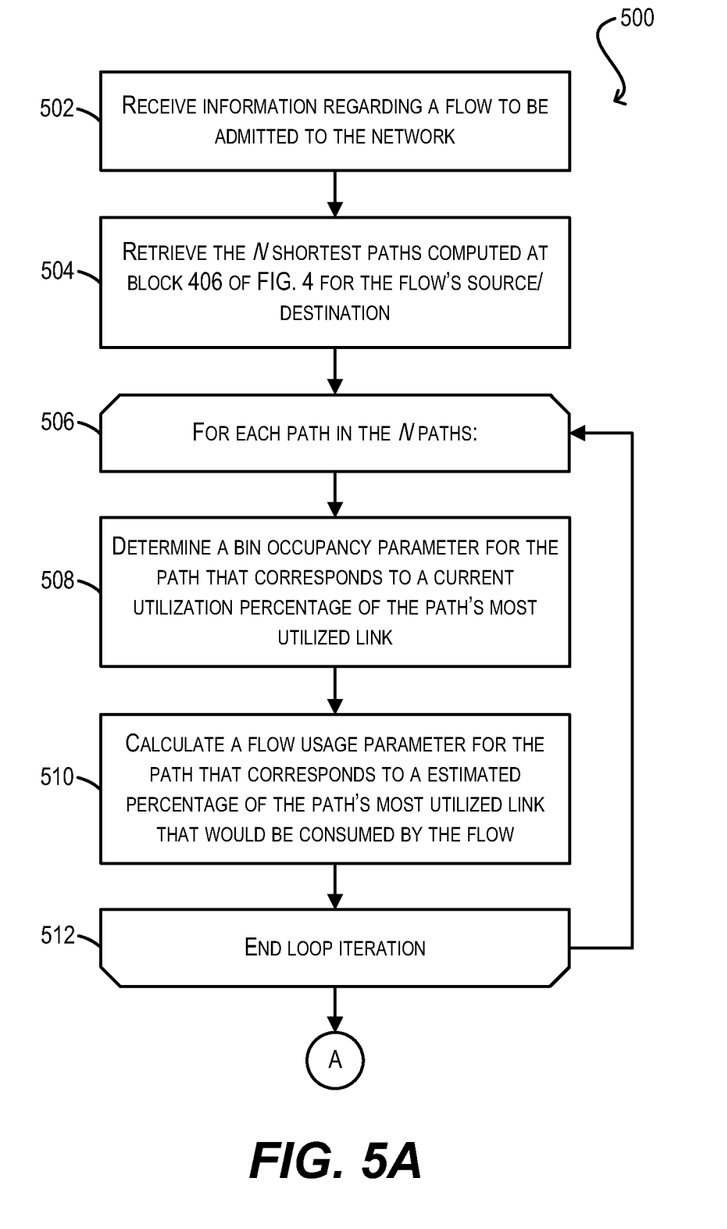
FIGS. 5A and 5B depict a flowchart for assigning a flow to a path according to an embodiment.
Figure 5B:
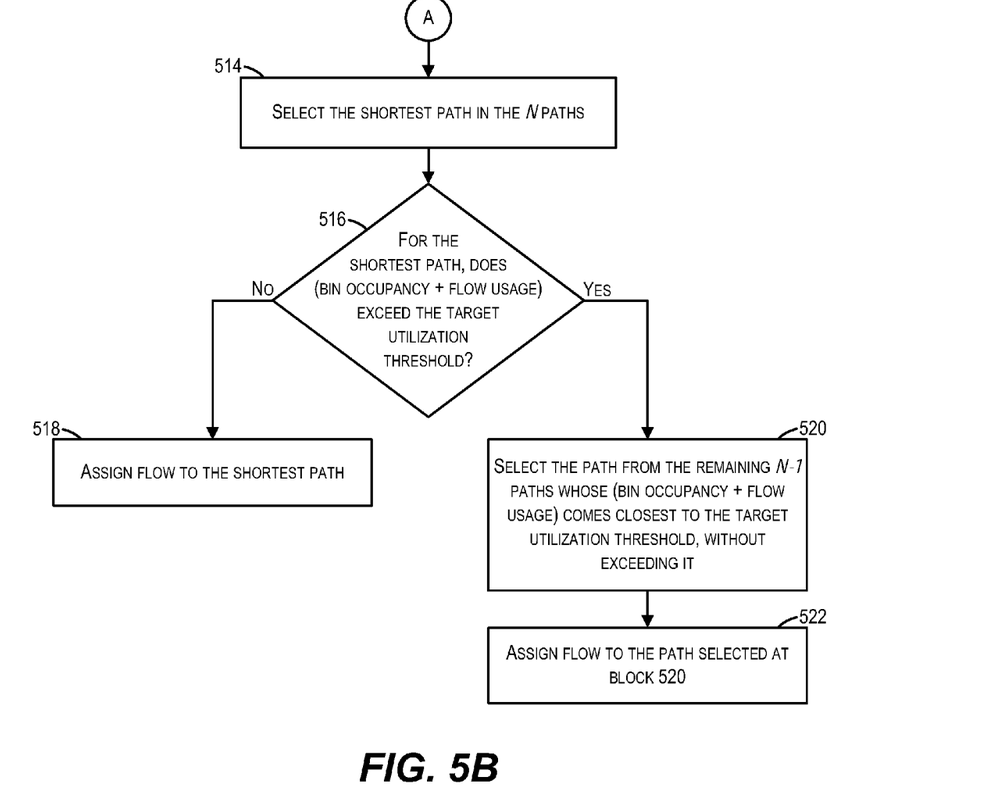

FIGS. 5A and 5B depict a process 500 that can be performed by optimization module 208 (after process 400 of FIG. 4) for assigning a flow to a path in an optimal fashion according to an embodiment. For the purposes of this disclosure, a "flow" can be considered a sequence of related packets from a source to a destination (e.g., all packets sent by a particular application).

Starting with FIG. 5A, at block 502, optimization module 208 can receive information regarding a flow to be admitted to network 204. For example, this information can include the source and destination of the flow, as well as an estimated flow volume (in MB/sec or GB/sec). The estimated flow volume can be determined by, e.g., sampling the flow through SDN controller 206 or querying an appropriate server (e.g. a Job-Tracker in the case of a Hadoop flow).

At block 504, optimization module 208 can retrieve the list of N shortest paths that were previously computed at block 406 of FIG. 4 for the flow's source and destination. These paths can be considered potential candidate paths for the flow. Optimization module 208 can then enter a loop for each path in the list of N paths (block 506).

Within loop 506, optimization module 208 can determine a "bin occupancy" parameter for the current path, which corresponds to a current utilization percentage of the most utilized link in the path (block 508). For example, if the most utilized link has a bandwidth capacity of 10 GB/sec and 5 GB/sec is currently utilized, the bin occupancy parameter will be 5/10×100%=50%. Generally speaking, optimization module 208 can collect the statistics needed for this calculation by periodically monitoring the link utilization levels in network 204 through SDN controller 206. In one embodiment, optimization module 208 can use the instantaneous utilization of the most utilized link as its "current" utilization; in other embodiments, optimization module 208 can use an average utilization of the most utilized link that has been calculated over a recent time window.

At block 510, optimization module 208 can also determine a "flow usage" parameter for the current path, which corresponds to an estimated bandwidth percentage of the path's most utilized link that would be consumed by the flow. Optimization module 208 can calculate this parameter by, e.g., taking the estimated flow volume received at block 502 and dividing that volume by the bandwidth capacity of the most utilized link. For instance, returning to the example above (where the most utilized link has a bandwidth capacity of 10 GB/sec), if the flow has an estimated volume of 2 GB/sec, the flow usage parameter will be 2/10×100%=20%. It should be noted that the bandwidth capacity used in this calculation (as well as the bin occupancy calculation) may be affected by user-defined policy, and thus may not reflect the actual, physical capacity of the most utilized link. For example, the most utilized link may have a physical bandwidth capacity of 20 GB/sec, but only half of that may be provisioned for use in network 204 (thus resulting in a 10 GB/sec max capacity).

Once the bin occupancy and flow usage parameters have been calculated, the current loop iteration can end (block 512) and the loop can be repeated for additional paths. Process 500 can then proceed as shown in FIG. 5B.

At block 514 of FIG. 5B, optimization module 208 can select the shortest path in the list of N shortest paths. For example, if the list is ordered for shortest to longest, optimization module 208 can select the first path in the list. Optimization module 208 can then calculate the projected utilization for the shortest path by aggregating the path's bin occupancy parameter and flow usage parameter, and can check whether this projected utilization exceeds a predefined utilization threshold (i.e., the "target utilization threshold") (block 516). If not, optimization module can assign the flow to the shortest path and process 500 can end (block 518).

On the other hand, if the projected utilization of the shortest path does exceed the target utilization threshold, optimization module 208 can select the path in the remaining N−1 paths whose projected utilization (i.e., bin occupancy+flow usage) comes closest to the target utilization threshold, without exceeding it (block 520). In other words, optimization module 208 can select the path among the remaining candidate paths that will best minimize bandwidth fragmentation in the network. Optimization module 208 can subsequently assign the flow to the selected path and process 500 can end (block 522).

It should be appreciated that the path selection/assignment process of FIGS. 5A and 5B is illustrative and various modifications are possible. For example, rather than calculating the bin occupancy and flow usage parameters for every candidate path per loop 506-512, in some embodiments optimization module 208 can delay the calculation of these parameters until they are actually needed for determining the projected utilization for a given path (e.g., at blocks 516 and 520). This avoids the need to calculate these parameters for paths that ultimately will not be considered.

In further embodiments, rather than selecting a path at block 520 that best minimizes bandwidth fragmentation, optimization module 208 can alternatively select the first path in the list (assuming the list is ordered from shortest to longest) whose projected utilization is below the target utilization threshold, or select a random path whose projected utilization is below the target utilization threshold. These alternative selection mechanisms do not offer the benefit of reducing bandwidth fragmentation, but can still provide effective load balancing.

In yet further embodiments, optimization module 208 can apply additional layers of decision processing based on one or more user-defined policy constraints. For instance, assume that the flow to be admitted belongs to a certain class-of-service (CoS) and thus should be routed over a policy-defined path. In this scenario, the policy-defined path may take precedence over the automatically selected path. As another example, if the flow is associated with a service level agreement (SLA) that has a specified maximum latency, optimization module 208 can implement an additional check that ensures the expected latency for the automatically selected path does not exceed the maximum latency specified in the SLA. One of ordinary skill in the art will recognize many variations, modifications, and alternatives.

5. Flow Reallocation

One limitation with the path selection/assignment process shown in FIGS. 5A and 5B is that it does not touch existing flows that have already been admitted and assigned to a path in the network (unless those flows are explicitly removed and re-admitted). This limitation can be problematic because flows are generally dynamic in nature and thus can change in volume over time. For example, a flow may initially have a volume of 2 GB/sec at the time of admittance, but may subsequently grow to 10 GB/sec after some period of time. This change can lead to congestion along the flow's assigned path, since the path was originally assigned with the assumption that the flow would only consume 2 GB/sec of bandwidth.

To address this, in certain embodiments optimization module 208 can execute a process that runs in parallel with process 500 and that automatically reallocates one or more existing flows when one of the assigned paths becomes congested. An example of such a reallocation process is shown in FIG. 6 as process 600.

Figure 6:
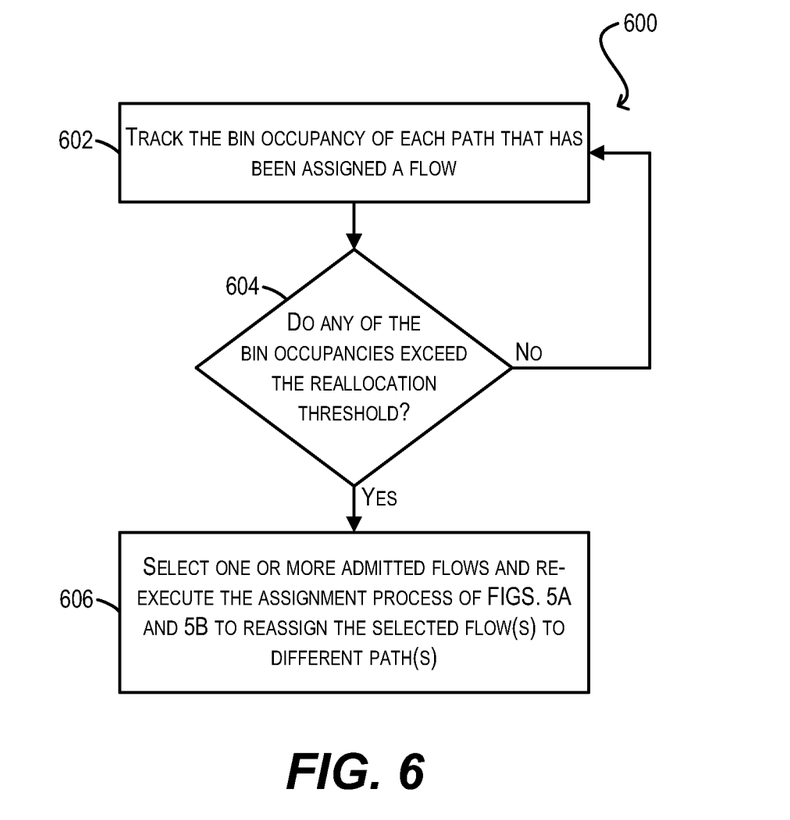
FIG. 6 depicts a flowchart for reallocating one or more admitted flows to different paths according to an embodiment.

At block 602 of FIG. 6, optimization module 208 can track the bin occupancy of each path in network 204 that has been assigned to a flow (per, e.g., process 500). As noted previously, the bin occupancy reflects the current utilization percentage, or level, of the most utilized link in the path. In a particular embodiment, optimization module 208 can perform this tracking at a periodic interval (e.g., once every 30 seconds, 1 minute, 5 minutes, etc.), where the interval is defined by policy.

At block 604, optimization module 208 can check whether any of the bin occupancies being tracked at block 602 have exceeded another predefined threshold (i.e., the "reallocation threshold"). Generally speaking, the reallocation threshold can be greater than the target utilization threshold used in path selection/assignment process 500, but can be less than 100%.

If none of the bin occupancies have exceeded the reallocation threshold, process 600 can return to block 602 and optimization module 208 can continue its tracking. Otherwise, optimization module 208 can select one or more of the admitted flows in the network and can re-execute path selection/assignment process 500 with respect to the selected flow(s) (block 606). In this manner, optimization module 208 can potentially reallocate those flows to different paths than before, and thereby achieve better load balancing across the network.

In one embodiment, the determination of which flows should be reallocated at block 606 can be based on the size of the flows. For example, large flows may be given priority for reallocation, since such flows may be more likely to cause congestion (and thus stand to benefit most from reallocation). In alternative embodiments, other types of criteria can be used.

In further embodiments, when optimization module 208 re-executes process 500 for an admitted flow, optimization module 208 can first "subtract out" the current utilization of the admitted flow from the link utilization statistics that it maintains for the network. This ensures that the flow's utilization is not "double counted" when optimization module 208 calculates the flow's projected utilization with respect to a given candidate path (which may occur of the flow's currently assigned path and the candidate path share one or more links). It should be noted that this double counting phenomenon should not occur if the list of candidate paths for the flow are topologically independent.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
   receiving, by a computer system, information regarding a flow to be admitted to a network, the flow being associated with a source and a destination;
   for each path in a plurality of paths between the source and the destination, calculating, by the computer system, a projected utilization of the path in view of the flow;
   if the projected utilization of a shortest path in the plurality of paths is less than or equal to a target utilization threshold, assigning, by the computer system, the flow to the shortest path;

else if the projected utilization of the shortest path is greater than the target utilization threshold:
  selecting, by the computer system, a path in the plurality of paths whose projected utilization comes closest to the target utilization threshold without exceeding the threshold; and
  assigning, by the computer system, the flow to the selected path.

2. The method of claim 1 wherein the projected utilization of each path in the plurality of paths is based on:
  a current utilization percentage of a most utilized link in the path; and
  an estimated percentage of the most utilized link that would be consumed by the flow.

3. The method of claim 2 wherein the current utilization percentage of the most utilized link corresponds to an average utilization percentage over a recent time window.

4. The method of claim 1 further comprising, prior to the receiving:
  determining topology information and one or more policies for the network; and
  computing the plurality of paths using the topology information and the one or more policies.

5. The method of claim 4 wherein the plurality of paths comprise a preconfigured number of shortest paths between the source and the destination.

6. The method of claim 5 wherein the preconfigured number is defined by one of the one or more policies.

7. The method of claim 5 wherein no two paths in the plurality of paths include a common link.

8. The method of claim 1 further comprising:
  tracking utilization of the path assigned to the flow; and
  if the utilization rises above a reallocation threshold, repeating the steps of claim 1 in order to reassign the flow to a different path in the plurality of paths.

9. The method of claim 8 wherein the utilization of the path is determined based on utilization of a most utilized link in the path.

10. The method of claim 1 wherein the computer system is a software defined networking (SDN) controller device.

11. A non-transitory computer readable medium having stored thereon program code executable by a processor, the program code comprising:
  code that causes the processor to receive information regarding a flow to be admitted to a network, the flow being associated with a source and a destination;
  code that causes the processor to, for each path in a plurality of paths between the source and the destination, calculate a projected utilization of the path in view of the flow;
  if the projected utilization of a shortest path in the plurality of paths is less than or equal to a target utilization threshold, code that causes the processor to assign the flow to the shortest path;
  else if the projected utilization of the shortest path is greater than the target utilization threshold:
    code that causes the processor to select a path in the plurality of paths whose projected utilization comes closest to the target utilization threshold without exceeding the threshold; and
    code that causes the processor to assign the flow to the selected path.

12. The non-transitory computer readable medium of claim 11 wherein the projected utilization of each path in the plurality of paths is based on:
  a current utilization percentage of a most utilized link in the path; and
  an estimated percentage of the most utilized link that would be consumed by the flow.

13. The non-transitory computer readable medium of claim 11 wherein the program code further comprises:
  code that causes the processor to determine topology information and one or more policies for the network; and
  code that causes the processor to compute the plurality of paths using the topology information and the one or more policies.

14. The non-transitory computer readable medium of claim 13 wherein the plurality of paths comprise a preconfigured number of shortest paths between the source and the destination.

15. The non-transitory computer readable medium of claim 11 wherein the program code further comprises:
  code that causes the processor to track utilization of the path assigned to the flow; and
  if the utilization rises above a reallocation threshold, code that causes the processor to repeat the steps embodied in the program code of claim 11 in order to reassign the flow to a different path in the plurality of paths.

16. A computer system comprising:
  a processor; and
  a non-transitory computer readable medium having stored thereon executable program code which, when executed by the processor, causes the processor to:
    receive information regarding a flow to be admitted to a network, the flow being associated with a source and a destination;
    for each path in a plurality of paths between the source and the destination, calculate a projected utilization of the path in view of the flow;
    if the projected utilization of a shortest path in the plurality of paths is less than or equal to a target utilization threshold, assign the flow to the shortest path;
    else if the projected utilization of the shortest path is greater than the target utilization threshold:
      select a path in the plurality of paths whose projected utilization comes closest to the target utilization threshold without exceeding the threshold; and
      assign the flow to the selected path.

17. The computer system of claim 16 wherein the projected utilization of each path in the plurality of paths is based on:
  a current utilization percentage of a most utilized link in the path; and
  an estimated percentage of the most utilized link that would be consumed by the flow.

18. The computer system of claim 16 wherein the program code further causes the processor to, prior to the receiving:
  determine topology information and one or more policies for the network; and
  compute the plurality of paths using the topology information and the one or more policies.

19. The computer system of claim 18 wherein the plurality of paths comprise a preconfigured number of shortest paths between the source and the destination.

20. The computer system of claim 16 wherein the program code further causes the processor to:
  track utilization of the path assigned to the flow; and
  if the utilization rises above a reallocation threshold, repeat the steps performed by the processor in claim 16 in order to reassign the flow to a different path in the plurality of paths.

* * * * *